(12) United States Patent
Ikeda et al.

(10) Patent No.: US 8,676,578 B2
(45) Date of Patent: Mar. 18, 2014

(54) MEETING SUPPORT APPARATUS, METHOD AND PROGRAM

(75) Inventors: Tomoo Ikeda, Tokyo (JP); Nobuhiro Shimogori, Kawasaki (JP); Kouji Ueno, Kawasaki (JP)

(73) Assignee: Kabushiki Kaisha Toshiba, Minato-ku, Tokyo (JP)

( * ) Notice: Subject to any disclaimer, the term of this patent is extended or adjusted under 35 U.S.C. 154(b) by 397 days.

(21) Appl. No.: 13/071,548

(22) Filed: Mar. 25, 2011

(65) Prior Publication Data
US 2012/0078629 A1 Mar. 29, 2012

(30) Foreign Application Priority Data
Sep. 28, 2010 (JP) ................................ 2010-217898

(51) Int. Cl.
*G10L 15/26* (2006.01)

(52) U.S. Cl.
USPC ............ 704/235; 704/243; 704/236; 704/257

(58) Field of Classification Search
USPC ............ 704/1–10, 251, 255, 257, 270, 270.1, 704/233, 235, 236
See application file for complete search history.

(56) References Cited

U.S. PATENT DOCUMENTS

| | | | | |
|---|---|---|---|---|
| 6,389,394 B1 * | 5/2002 | Fanty | .................... | 704/249 |
| 6,983,248 B1 * | 1/2006 | Tahara et al. | .................. | 704/255 |
| 7,966,171 B2 * | 6/2011 | Gilbert et al. | ..................... | 704/8 |

FOREIGN PATENT DOCUMENTS

| JP | 10-340095 A | 12/1998 |
|---|---|---|
| JP | 11-202889 A | 7/1999 |
| JP | 2001-147919 | 5/2001 |
| JP | 2002-304190 A | 10/2002 |
| JP | 2002-344915 A | 11/2002 |
| JP | 2004-170983 | 6/2004 |
| JP | 2006-251898 A | 9/2006 |
| JP | 2009-145856 A | 7/2009 |

OTHER PUBLICATIONS

Japanese Office Action dated Aug. 28, 2012 from corresponding JP Application No. 2010-217898, 5 pages.
Shimogori, et al.; "The Effect of Automatic Generated Caption in Meetings"; Information Processing Society Symposium Series [CD-ROM]; Japan, Information Processing Society of Japan, Jul. 8, 2009; vol. 2009 No. 1; pp. 687-694.
Wald, et al., "*Using Speech Recognition for Real-Time Captioning of Multiple Speakers*"; IEEE Computer Society, 2008, pp. 56-57.

* cited by examiner

*Primary Examiner* — Huyen X. Vo
(74) *Attorney, Agent, or Firm* — Ohlandt, Greeley, Ruggiero & Perle, L.L.P.

(57) ABSTRACT

According to one embodiment, a meeting support apparatus includes a storage unit, a determination unit, a generation unit. The storage unit is configured to store storage information for each of words, the storage information indicating a word of the words, pronunciation information on the word, and pronunciation recognition frequency. The determination unit is configured to generate emphasis determination information including an emphasis level that represents whether a first word should be highlighted and represents a degree of highlighting determined in accordance with a pronunciation recognition frequency of a second word when the first word is highlighted, based on whether the storage information includes second set corresponding to first set and based on the pronunciation recognition frequency of the second word when the second set is included. The generation unit is configured to generate an emphasis character string based on the emphasis determination information when the first word is highlighted.

9 Claims, 8 Drawing Sheets

FIG. 1

| | 201 | 202 | 203 |
|---|---|---|---|
| | Word | Pronunciation information | Pronunciation time information |
| | I | ahy | 2010/02/28 11:00:00 |
| | will | wil | 2010/02/28 11:00:01 |
| | arrange | uh-reynj | 2010/02/28 11:00:02 |
| | my | mahy | 2010/02/28 11:00:03 |
| | schedule | shed-yool | 2010/02/28 11:00:04 |

FIG. 2

| | 201 | 202 | 301 | 302 |
|---|---|---|---|---|
| | Word | Pronunciation information | Pronunciation recognition frequency | Last-pronounced time information |
| | arrange | uh-reynj | 10 | 2010/02/27 13:00:02 |
| | I | ahy | 49 | 2010/02/28 10:00:00 |
| | my | mahy | 35 | 2010/02/27 11:00:07 |
| | schedule | skej-ool | 23 | 2010/02/27 15:00:20 |
| | schedule | shed-yool | 1 | 2010/02/20 11:00:04 |
| | will | wil | 30 | 2010/02/26 11:00:00 |

| 501 Frequency ratio | 502 Frequency emphasis level |
|---|---|
| Less than 10% | 3 |
| Not less than 10% and less than 20% | 2 |
| Not less than 20% and less than 30% | 1 |
| Not less than 30% | 0 |

FIG. 5

| 601 Elapse time | 602 Elapse emphasis level |
|---|---|
| Not less than 604,800 seconds | 1 |
| Less than 604,800 seconds | 0 |

FIG. 6

| 201 Word | 502 Frequency emphasis level | 602 Elapse emphasis level |
|---|---|---|
| I | 0 | 0 |
| will | 0 | 0 |
| arrange | 0 | 0 |
| my | 0 | 0 |
| schedule | 3 | 1 |

| Frequency emphasis level | Elapse emphasis level | Start tag | End tag |
|---|---|---|---|
| 3 | 1 | <span style="font-weight:bold;color:red;font-size=x-large;"> | </span> |
| 3 | 0 | <span style="color:red;font-size=x-large;"> | </span> |
| 2 | 1 | <span style="font-weight:bold;color:red;font-size=large;"> | </span> |
| 2 | 0 | <span style="color:red;font-size=large;"> | </span> |
| 1 | 1 | <span style="font-weight:bold;color:red;font-size=medium;"> | </span> |
| 1 | 0 | <span style="color:red;font-size=medium;"> | </span> |
| 0 | 1 | | |
| 0 | 0 | | |

F I G. 9

I will arrange my<span style="font-weight:bold;color:red;font-size=x-large;">schedule</span>

F I G. 10

I will arrange my schedule

F I G. 11

F I G. 12

F I G. 13

MEETING SUPPORT APPARATUS, METHOD AND PROGRAM

CROSS-REFERENCE TO RELATED APPLICATIONS

This application is based upon and claims the benefit of priority from Japanese Patent Application No. 2010-217898, filed Sep. 28, 2010; the entire contents of which are incorporated herein by reference.

FIELD

Embodiments described herein relate generally to a meeting support apparatus, method and program.

BACKGROUND

When a meeting with foreigners is held, a known system performs speech recognition for spoken words of a participant in the meeting, converts the recognition result of the spoken words into a text, and displays the text on a screen as a subtitle. Another known system outputs what the speaker emphasizes as being visually recognized, and still another known system displays words which are considered hard for the user to recognize.

DETAILED DESCRIPTION

In general, according to one embodiment, a meeting support apparatus includes a storage unit, a determination unit, a generation unit. The storage unit is configured to store storage information for each of words, the storage information indicating a word of the words, pronunciation information on the word, and pronunciation recognition frequency which represents number of times that same pronunciation corresponding to the word is spoken. The determination unit is configured to generate emphasis determination information including an emphasis level that represents whether or not a first word of the words is highlighted and represents a degree of highlighting determined in accordance with a pronunciation recognition frequency of a second word of the words when the first word is highlighted, the generating the emphasis determination information being based on whether or not the storage information includes a second set corresponding to a first set and based on the pronunciation recognition frequency of the second word when the second set is included in the storage information, the first set representing a combination between the first word and pronunciation information on the first word, the second set representing a combination between the second word and pronunciation information on the second word and being pre-stored in the storage unit. The generation unit is configured to generate an emphasis character string based on the emphasis determination information when the first word is highlighted, the emphasis character string being obtained by combining a symbol to the first word, the symbol representing that the degree of highlighting is increased in accordance with an increase in the emphasis level.

A description will now be given of a meeting support apparatus, method and program according to the present embodiment with reference to the accompanying drawings. In the embodiment described below, the same reference numerals will be used to denote similar-operation elements, and a repetitive description of such elements will be omitted.

First Embodiment

Figure 1:
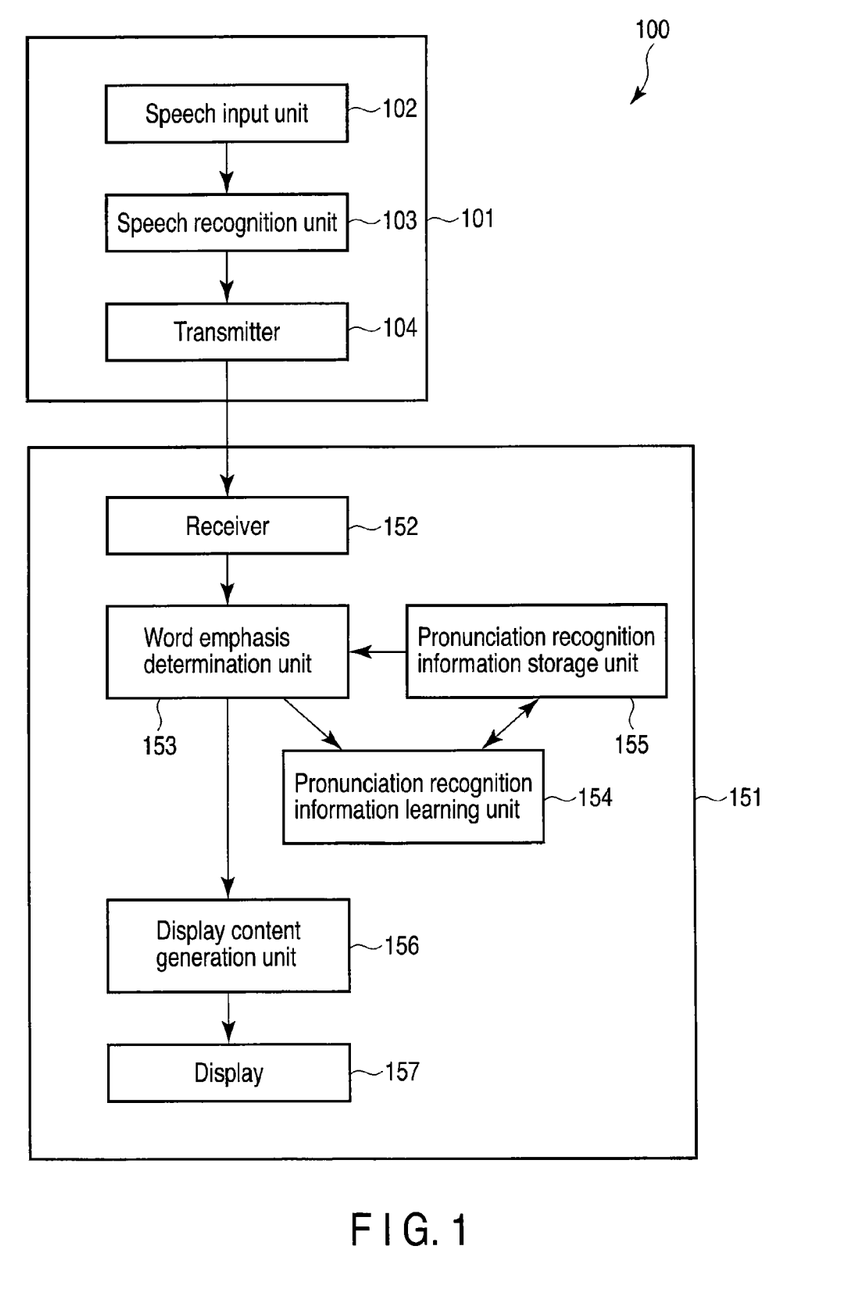
FIG. 1 is a block diagram illustrating a meeting support apparatus according to the first embodiment.

A meeting support apparatus according to the first embodiment will be described with reference to FIG. 1.

The meeting support apparatus 100 of the first embodiment includes a transmission device 101 and a reception device 151. The transmission device 101 includes a speech input unit 102, a speech recognition unit 103 and a transmitter 104. The reception device 151 includes a receiver 152, a word emphasis determination unit 153, a pronunciation recognition information learning unit 154, a pronunciation recognition information storage unit 155, a display content generation unit 156, and a display 157.

The transmission device 101 is an apparatus used by a speaker, while the reception device 151 is an apparatus used by a user who understands the speaker's speech by text messages. In the present embodiment, it is assumed that a meeting is conducted using English as the language, a first participant in the meeting (i.e., a speaker) speaks English, and a second participant (i.e., the user) understands the speaker's speech by referring to text messages, which are results of the speech recognition of the speech spoken in English.

The speech input unit 102 is a microphone, for example. The speech input unit 102 captures the spoken words of a participant in a meeting as a speech and converts it into a speech signal.

The speech recognition unit 103 receives the speech signal from the speech input unit 102 and converts it into a corresponding character string. The conversion of the speech signal into the character string may be performed by a general speech recognition technique. The speech recognition unit 103 generates not only the character string, which is a result of conversion, but also speech recognition result information for each of the words included in the character string. The speech recognition result information is a correspondence relation between pronunciation information representing how each word is pronounced, and pronunciation time information representing when the word is pronounced.

The transmitter 104 receives the speech recognition result information from the speech recognition unit 103 and sends it to at least one reception device 151.

The receiver 152 receives the speech recognition result information sent from the transmitter 104 of the transmission device 101. The communications between the transmitter 104 and the receiver 152 may be performed by wire using an optical fiber or a coaxial cable, or by wireless using a wireless LAN.

The word emphasis determination unit 153 receives the speech recognition result information from the receiver 152 and storage information from a pronunciation recognition information storage unit 155, which will be described later. Upon receipt of the information, the word emphasis determination unit 153 generates emphasis determination information for each of the words included in the speech recognition result information. The emphasis determination information includes information representing whether a word should be highlighted, and, if the word is highlighted, information representing how the word should be highlighted. The determination processing by the word emphasis determination unit 153 and the emphasis determination information will be described later with reference to FIGS. 4 through 7.

The pronunciation recognition information learning unit 154 receives the speech recognition result information from the word emphasis determination unit 153 and records it in the pronunciation recognition information storage unit 155. Although not shown, the pronunciation recognition information learning unit 154 may receive the speech recognition result information from the receiver 152. The operation of the pronunciation recognition information learning unit 154 will be described later.

The pronunciation recognition information storage unit 155 receives the speech recognition result information from the pronunciation recognition information learning unit 154 and stores information for each of the words in such a manner that a word, pronunciation information on the word, a pronunciation recognition frequency and last-pronounced time information are associated with one another. The pronunciation recognition frequency represents the number of times the same pronunciation occurs for a word, in other words, the number of times the word is spoken. The last-pronounced time information represents the time when the word is pronounced last. The storage method may be implemented by a relational database, for example. The storage information will be described later with reference to FIG. 3.

The display content generation unit 156 receives the emphasis determination information from the word emphasis determination unit 153. Based on an emphasis level correspondence table and the emphasis determination information, the display content generation unit 156 outputs the received information as they are for words that are not to be highlighted, and generates an emphasis character string for words that are to be highlighted, by combining a character string to be emphasized to the words. The emphasis level correspondence table is a table representing how words should be highlighted in accordance with the emphasis determination information. The emphasis level correspondence table and the emphasis character string will be described later with reference to FIGS. 9 and 10.

The display 157 receives the character string including the highlighted character string from the display content generation unit 156 and shows a display character string on a screen as a subtitle. The display character string is a character string including words that are emphasized in accordance with the emphasis character string.

Figure 2:
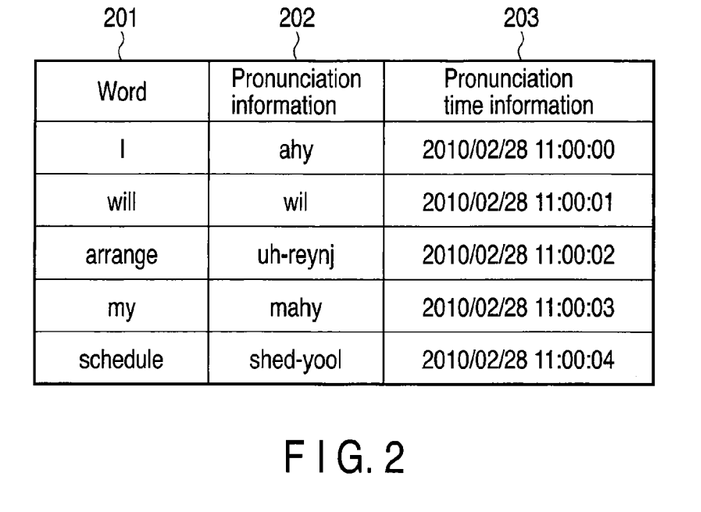
FIG. 2 shows an example of speed recognition result information.

A description will now be given of an example of the speech recognition result information generated by the speech recognition unit 103, with reference to FIG. 2.

A word 201, pronunciation information 202 on the word 201 and pronunciation time information 203 on the word 201 are associated with one another and stored as speech recognition result information. To be specific, when "I" is input as the word 201, <<ahy>> is associated with "I" as pronunciation information 202. In addition, "2010/02/28 11:00:00" is associated with "I" as pronunciation time information 203. In this manner, the speech recognition result information on the word "I" is generated. In the description below, the character string enclosed within << >> is phonetic symbols.

Different pronunciations of the same word are stored separately. For example, "schedule" has two pronunciations <<skej-ool>> and <shed-yool>>, and these pronunciations are stored as different speech recognition result information. A combination of the word 201 and the pronunciation information 202 is also referred to as a set.

In the present embodiment, the pronunciations are stored in the order in which the speaker pronounces words 201. However, this is in no way restrictive, and the pronunciations may be stored in the reverse order. The pronunciations may be stored in any way desired, as long as the word-pronunciation order can be determined.

Figure 3:
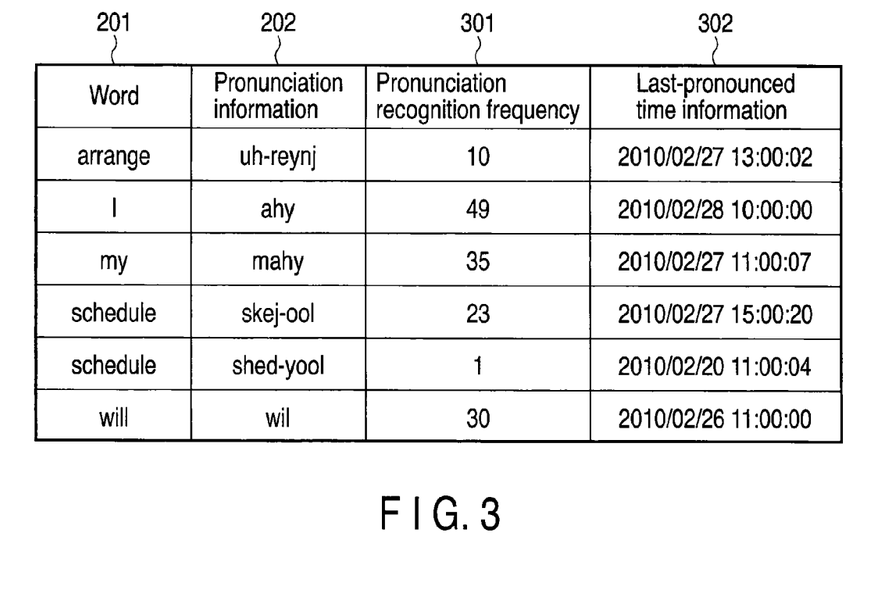
FIG. 3 shows an example of storage information stored in a pronunciation recognition information storing unit.

The storage information stored in the pronunciation recognition information storage unit 155 will be described with reference to FIG. 3.

The storage information is information obtained by associating the words 201, pronunciation information 202, pronunciation recognition frequencies 301 and last-pronounced time information 302, and is stored for each of the words 201. For example, in the case of the word "arrange" in FIG. 3, "arrange" which is the word itself, <<uh-reynj>> which is the pronunciation information 202, "10" which is the pronunciation recognition frequency 301 and "2010/02/27 13:00:02" which is the last-pronounced time information 302, are associated with one another. In general, if the speech recognition result information is stored as it is, the pronunciation time information 203 is stored as the last-pronounced time information 302.

The pronunciation recognition information storage unit 155 may store words and their associated pronunciations beforehand. Alternatively, the pronunciation recognition information storage unit 155 may store no data at the beginning. Furthermore, the pronunciation recognition information storage unit 155 may store association data between words and pronunciations in accordance with each user, instead of storing association data between general words and their pronunciations. For example, words which a speaker of the Japanese language may hear in the past and their pronunciations may be associated and stored. In addition, association data between words and pronunciations may be stored beforehand based on the English pronunciations used in the hometown of a user. For example, the pronunciations may be stored based on English-speaking regions of the user. If the user comes from Scotland, the pronunciations with the Scottish accent may be stored, and if the user comes from India, the pronunciations with the Indian accent may be stored. Furthermore, pronunciations may be stored based on an English-language career of each user. For example, if the user has an experience in studying in Australia, the pronunciations with the Australian accent may be stored beforehand.

A description will now be given of an operation of the pronunciation recognition information learning unit 154.

The pronunciation recognition information learning unit 154 checks the word and pronunciation information in the speech recognition result information received from the word emphasis determination unit 153 to see whether a word-and-pronunciation combination corresponding to the word and pronunciation information is stored. If no word-and-pronunciation combination corresponding to the word and pronunciation information is stored, speech recognition result information is recorded anew. To be specific, in the Table shown in FIG. 3, a new word is stored in the item of the word 201, new pronunciation information is stored in the item of the pronunciation information 202, "1" is stored in the item of the pronunciation recognition frequency 301, and pronunciation time information 203 is stored in the item of the last-pronounced time information 302. If the word-and-pronunciation combination corresponding to the word and pronunciation information is stored, "1" is added to the value of the pronunciation recognition frequency 301, and pronunciation time information 203 is recorded in the item of the last-pronounced time information 302.

Figure 4:
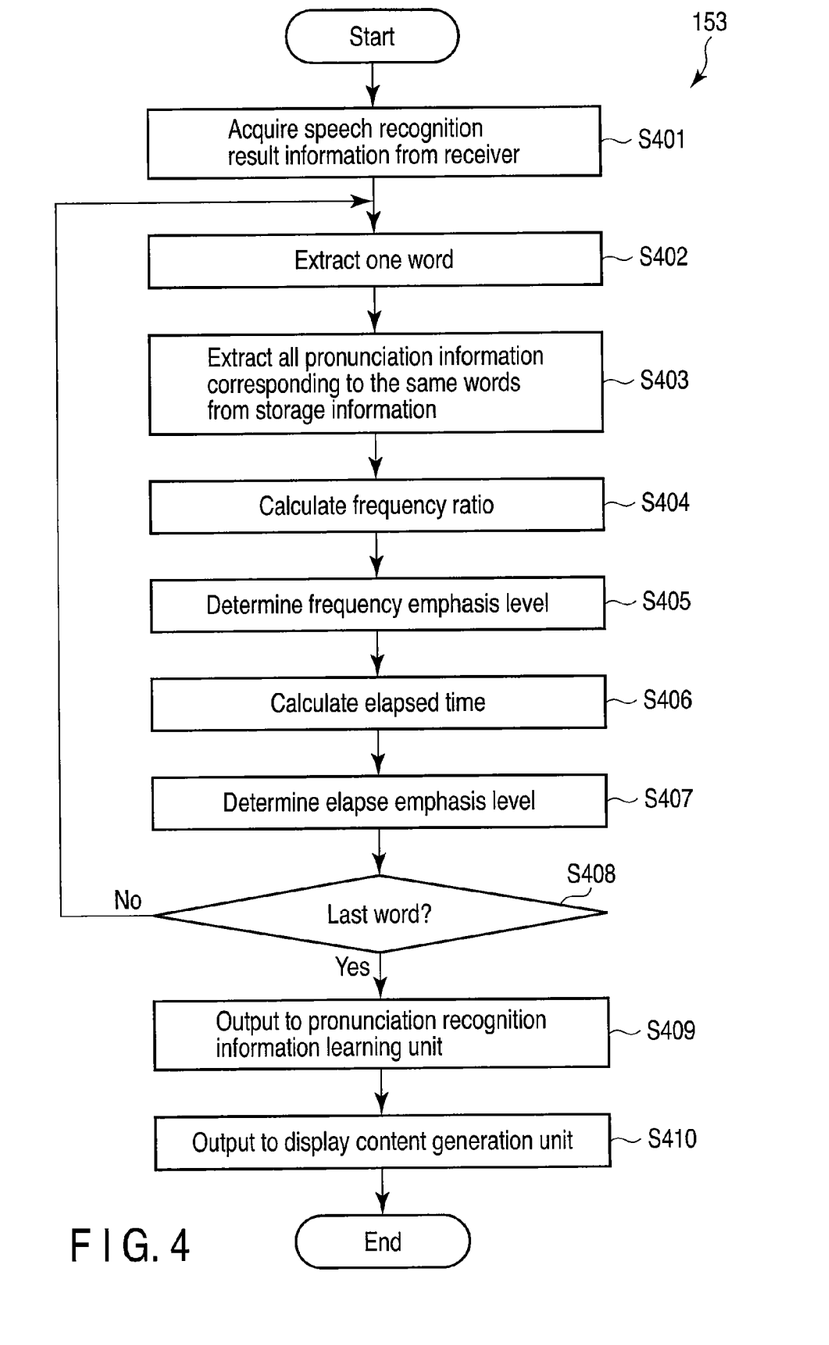
FIG. 4 is a flowchart illustrating determination processing performed by a word emphasis determination unit.

Determination performed by the word emphasis determination unit 153 will now be described in detail with reference to the flowchart shown in FIG. 4.

In step S401, speech recognition result information is acquired from the receiver 152.

In step S402, words are extracted from the speech recognition result information one by one in the order in which they are pronounced.

In step S403, storage information corresponding to the same words as those extracted from the words in step S402 is extracted from the storage information stored in the pronunciation recognition information storage unit 155.

In step S404, a frequency ratio is calculated. The frequency ratio represents the ratio of the pronunciations of the words extracted in step S402 to the pronunciations of the same words stored in the storage unit 155. The specific calculation of the frequency ratio will be described, referring to FIG. 3. For example, the pronunciation recognition frequency 301 of <<ahy>> of the word "I" is "49", and becomes "50" because of the pronunciation of the word being processed. Since the word "I" does not have other pronunciation information 202, the frequency ratio is 100 percent. On the other hand, the word "schedule" corresponds to two pronunciation information 202, namely <<shed-yool>> and <<skej-ool>>. The pronunciation recognition frequency 301 of <<shed-yool>> is "1" and becomes "2" because of the pronunciation of the word being processed. The pronunciation <<skej-ool>> remains "23". Accordingly, the frequency ratio of <<shed-yool>> can be calculated as 2/(2+23)×100, which is 8 percent. If the pronunciation recognition information storage unit 155 does not include the pronunciation of the word being processed, the frequency ratio can be regarded as 0 percent.

In step S405, a frequency emphasis level representing how a word should be emphasized is determined based on the frequency ratios calculated in step S404. To be more specific, the lower the frequency ratio is, the higher the degree of highlighting must be determined, and a higher frequency emphasis level is determined. The frequency emphasis level will be described later with reference to FIG. 5.

In step S406, the elapsed time between the point of time when the word under processing is heard last time and the point of time when the same pronunciation is heard this time is calculated. Referring to FIGS. 2 and 3, the elapsed time is a time between the last-pronounced time information 302 received from the pronunciation recognition information storage unit 155 and the pronunciation time information 203 included in the speech recognition result information. Specifically, the last-pronounced time information 302 on the pronunciation <<ahy>> corresponding to the word "I" is "2010/02/28 10:00:00", and the pronunciation time information 203 included in the speech recognition result information is "2010/02/28 11:00:00." Accordingly, the elapsed time is calculated as 3,600 seconds. Likewise, the last-pronounced time information 302 on the pronunciation <<shed-yool>> corresponding to the word "schedule" is "2010/02/20 11:00:04", and the pronunciation time information 203 included in the speech recognition result information is "2010/02/28 11:00:04." Accordingly, the elapsed time is calculated as 60×60×24×8, which is 691,200 seconds. If the word being processing is not included in the pronunciation recognition information storage unit 155, the elapsed time may be processed as being infinite.

In step S407, an elapse emphasis level is determined, which represents how much a word should be emphasized based on an elapse time. Specifically, the longer the elapsed time is, the higher the degree of highlighting must be increased, and a higher elapse emphasis level is determined. The elapse emphasis level will be described later with reference to FIG. 6.

In step S408, a determination is made as to whether the word processed in steps S402 through S407 is the last word. If the determination indicates that the processed word is the last one, the flow advances to step S409. If the determination indicates that the processed word is not the last one, the flow returns to step S402, and similar processing is repeated.

In step S409, the speech recognition result information is supplied to the pronunciation recognition information learning unit 154.

In step S410, the word subjected to the above processing is associated with the frequency emphasis level and elapse emphasis level corresponding to the word, and the resultant information is supplied to the display content generation unit 156.

The determination processing by the word emphasis determination unit 153 is performed as above. The determination processing described above may be performed for the speech recognition result information on each utterance by the speaker. Alternatively, it may be performed collectively for the speech recognition result information on the results of speech recognition which the speech recognition unit 103 performs at regular intervals.

A description will now be given of the frequency emphasis level determined in step S405 of FIG. 4, referring to FIG. 5.

Figure 5:
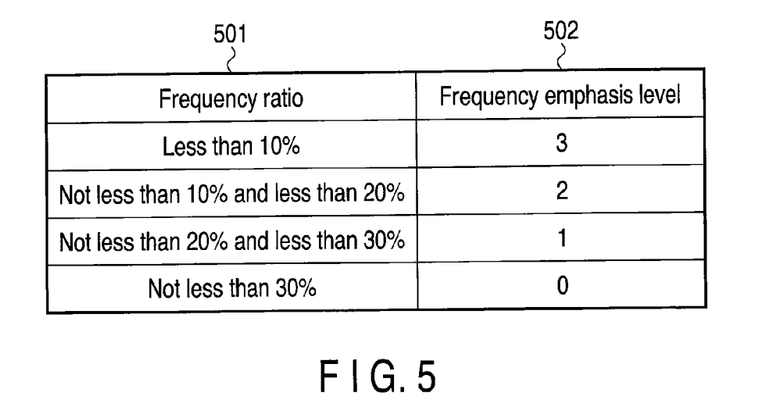
FIG. 5 shows relationships between a frequency ratio and a frequency emphasis level.

In FIG. 5, the frequency ratio 501 and frequency emphasis level 502 are associated with each other. By way of example, the frequency emphasis level 502 corresponding to the case where the frequency ratio 501 is less than 10 percent is determined as "3", the frequency emphasis level 502 corresponding to the case where the frequency ratio 501 is not less than 10 percent and less than 20 percent is determined as "2", the frequency emphasis level 502 corresponding to the case where the frequency ratio 501 is not less than 20 percent and less than 30 percent is determined as "1", and the frequency emphasis level 502 corresponding to the case where the frequency ratio 501 is not less than 30 percent is determined as "0." In the example of step S404 shown in FIG. 4, the frequency ratio 501 of pronunciation <<ahy>> of the word "I" is 100 percent, so that the frequency emphasis level 502 of pronunciation <<ahy>> is "0." On the other hand, the frequency ratio 501 of pronunciation <<shed-yool>> of the word "schedule" is 8 percent, so that the frequency emphasis level 502 is "3." As can be seen from this, a word is emphasized if its frequency ratio is low and is rarely heard. The associations between the frequency ratios and the frequency emphasis levels need not be determined in units of "10 percent"; it may be determined based on a smaller percentage.

That is, the frequency emphasis level is increased in accordance with a decrease in the frequency ratio.

A description will now be given of the elapse emphasis level determined in step S407, referring to FIG. 6.

Figure 6:
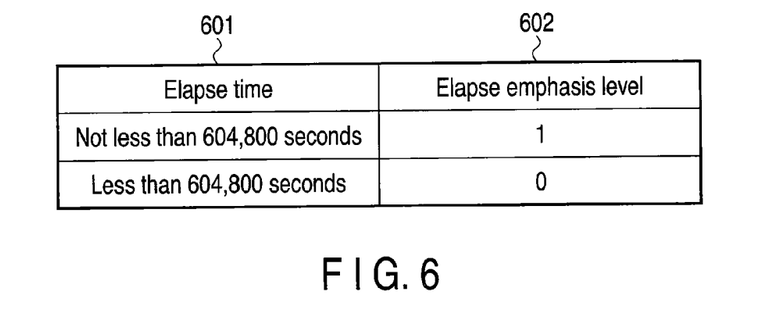
FIG. 6 shows relationships between an elapsed time and an elapse emphasis level.

In FIG. 6, the elapse time 601 and the elapse emphasis level 602 are associated with each other. In FIG. 6, the elapse emphasis level 602 is determined as "1" when the elapse time 601 is not less than 604,800 seconds (one week), and is determined as "0" when it is less than 604,800 seconds. In the example described in step S406, the elapse time 601 of pronunciation <<ahy>> of the word "I" is 3,600 seconds, so that the elapse emphasis level 602 is "0." On the other hand, the elapse time 601 of pronunciation <<shed-yool>> of the word "schedule" is 691,200 seconds, so that the elapse emphasis level 602 is "1." In this example, two elapse emphasis levels are determined using one week as a reference. However, elapse emphasis levels may be determined based on shorter periods than one week. For example, the elapse emphasis level may be increased based on the elapse time of one day.

Figure 7:
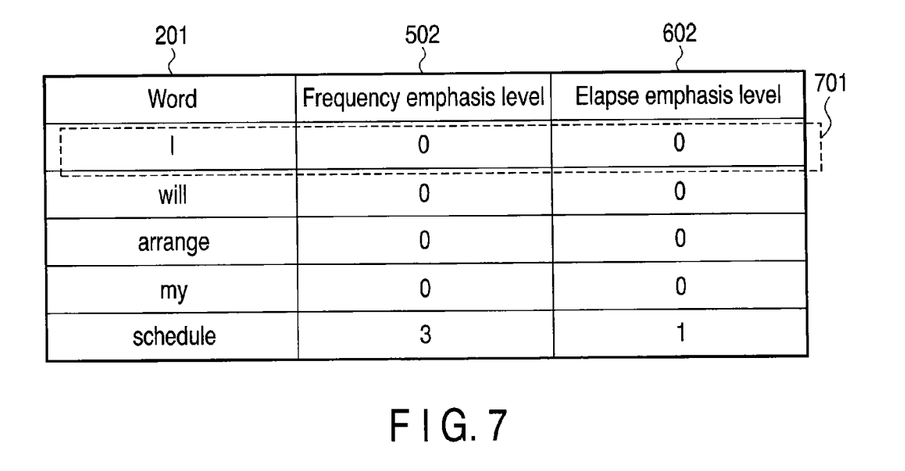
FIG. 7 shows examples of emphasis determination information generated by a word emphasis determination unit.

FIG. 7 shows an example of the emphasis determination information generated in step S410.

The emphasis determination information 701 represents how each word 201 is associated with the frequency emphasis level 502 determined in step S405 and with the elapse emphasis level determined in step S407. The frequency emphasis level and the elapse emphasis level may be collectively referred to as emphasis levels.

Figure 8:
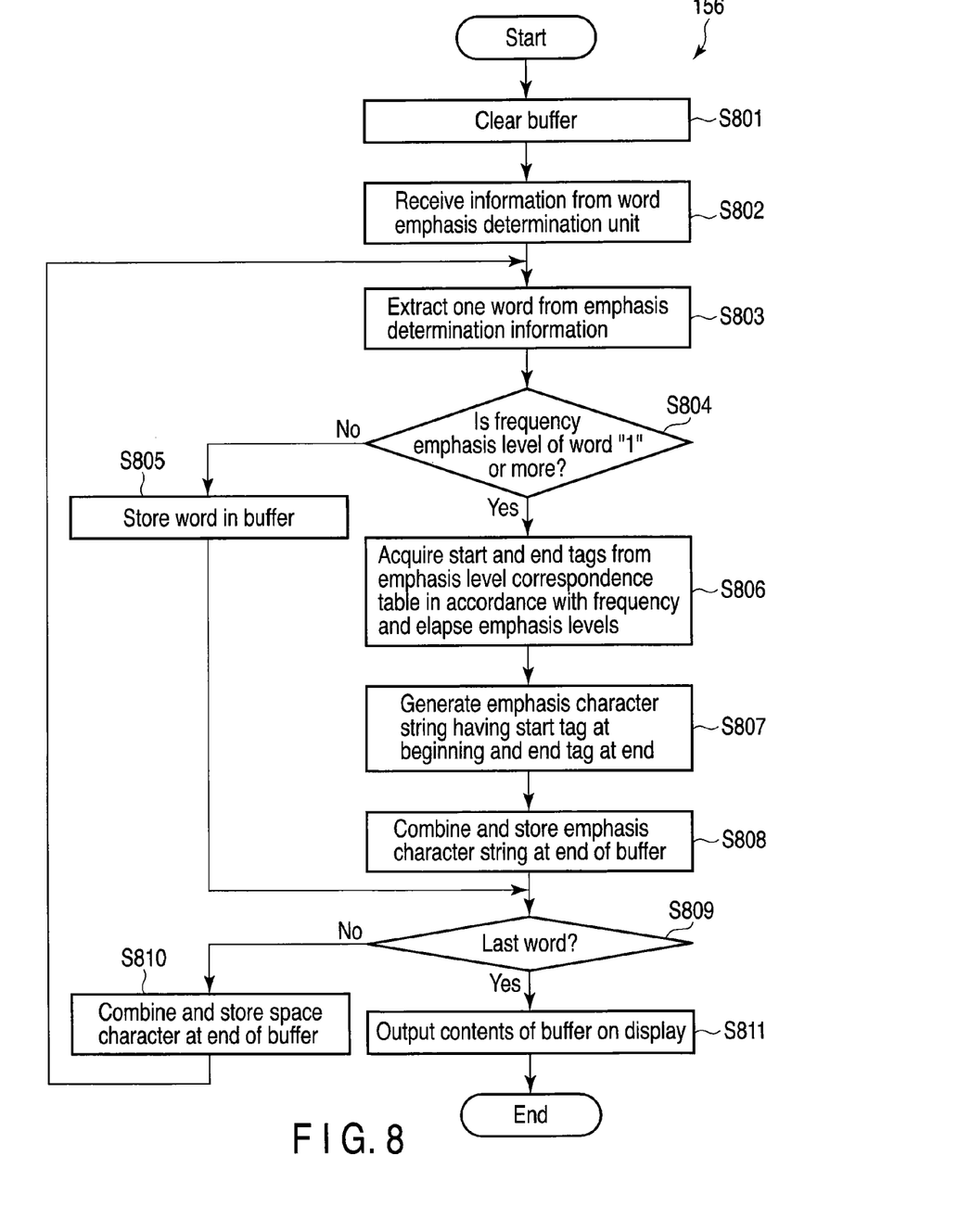
FIG. 8 is a flowchart illustrating processing performed by a display content generation unit.

A description will now be given of an operation of the display content generation unit 156, referring to the flowchart shown in FIG. 8.

In step S801, a buffer (not shown) used for displaying a character string is cleared.

In step S802, emphasis determination information is received from the word emphasis determination unit 153.

In step S803, one word is extracted from the emphasis determination information.

In step S804, a determination is made as to whether the frequency emphasis level of the extracted word is "1" or more. If this is not the case, the flow advances to step S805. If the frequency emphasis level is "1" or more, the flow advances to step S806.

In step S805, the word is stored in the buffer.

In step S806, a start tag and an end tag are acquired from the emphasis level correspondence table in accordance with the frequency emphasis level and elapse emphasis level extracted from step S804. The emphasis level correspondence table will be described later with reference to FIG. 9.

In step S807, the start tag is combined to the beginning of the extracted word and the end tag is combined to the end of the word. The resultant character string is generated as an emphasis character string.

In step S808, the character string generated in step S807 is combined and stored at the end of the buffer.

In step S809, a determination is made as to whether the word being processed is the last word. If the word being processed is not the last word, the flow advances to step S810. If it is, the flow advances to step S811.

In step S810, a space character is combined to the end of the character string stored in the buffer. Thereafter, the flow returns to step S803, and the similar processing is repeated.

In step S811, the contents of the buffer are displayed on the display 157 as a display character string. In this manner, the operation by the display content generation unit 156 is ended.

In the present embodiment, emphasis character strings are generated by combining tags, using notations compatible with those of an HTML (Hypertext Markup Language) style sheet, but this example is in no way restrictive. Tags may be described using other markup languages, such as the XML (Extensible Markup Language) and XHTML (Extensible Hypertext Markup Language). In addition, emphasis character strings may be generated by combining other highlighting symbols to words instead of using tag-combined character strings.

A description will now be given of an example of the emphasis level correspondence table, referring to FIG. 9.

The emphasis level correspondence table may be stored in the display content generation unit 156 beforehand; alternatively, it may be read externally when necessary. The emphasis level correspondence table represents which start tag 901 and which end tag 902 should correspond to each other in accordance with a combination between the frequency emphasis level 502 and the elapse emphasis level 602. As a word highlighting method, characters are displayed in red when the frequency emphasis level 502 is "1" or more. In addition, larger fonts are used for the characters of the displayed text in accordance with an increase in the frequency emphasis level 502, and bolder fronts are used for the characters of the displayed text in accordance with an increase in the elapse emphasis level 602. For example, when the frequency emphasis level 502 of a word is "3" and the elapse emphasis level 602 of the same word is "1", <span style="font-weight:bold; color:red; font-size=x-large;"> is combined to the beginning of the word as the start tag 901, and </span> is combined to the end of the word as the end tag 902. When the frequency emphasis level 502 of a word is "0", the characters of the word are not highlighted without reference to the value of the elapse emphasis level 602.

Figure 9:
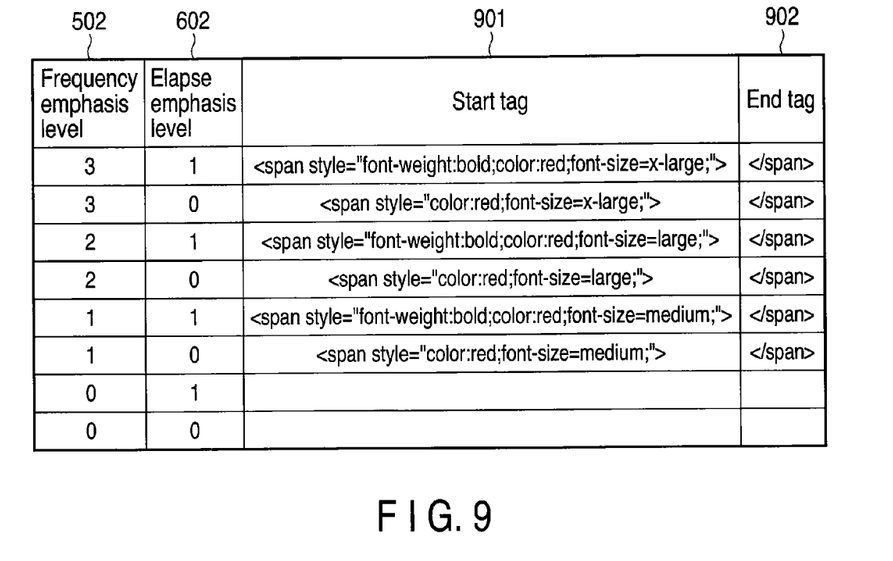
FIG. 9 shows an example of an emphasis level correspondence table.

The highlighting method shown in FIG. 9 is in no way restrictive, and blinking characters, animated characters (which move on the screen), or any other display methods may be used as long as the user can recognize that characters are highlighted or emphasized. In the present embodiment, the frequency emphasis level and the elapse emphasis level are determined independently of each other but they may be unified as one emphasis level. For example, in the case of FIG. 9 where the frequency emphasis level 502 is "3" and the elapse emphasis level 602 is "1", the unified emphasis level may be determined as "6." Likewise, in the case where the frequency emphasis level 502 is "2" and the elapse emphasis level 602 is "0", the unified emphasis level may be determined as "3."

Figure 10:
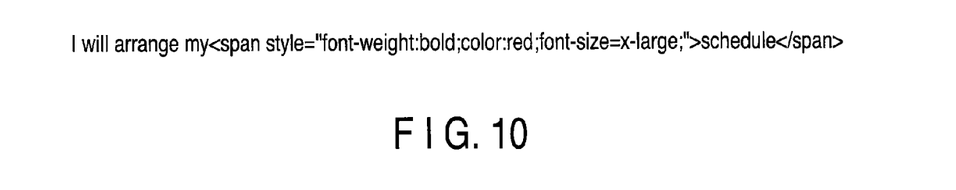
FIG. 10 shows an example of a character string including an emphasis character string generated by the display content generation unit.

FIG. 10 shows an example of a character string including emphasis character string "schedule."

In this example, it is assumed that the frequency emphasis level of the word "schedule" is "3" and the elapse emphasis level is "1." In this case, based on the emphasis level correspondence table, <span style="color:red; font-size=x-large; "> is combined to the beginning of the word "schedule" as the start tag 901, and </span> is combined to the end of the word as the end tag 902. Then, <span style="color:red; font-size=x-large;">schedule</span> is combined as an emphasis character string to the end of the utterance "I will arrange my" in the buffer, and a character string including this emphasis character string is generated.

Figure 11:
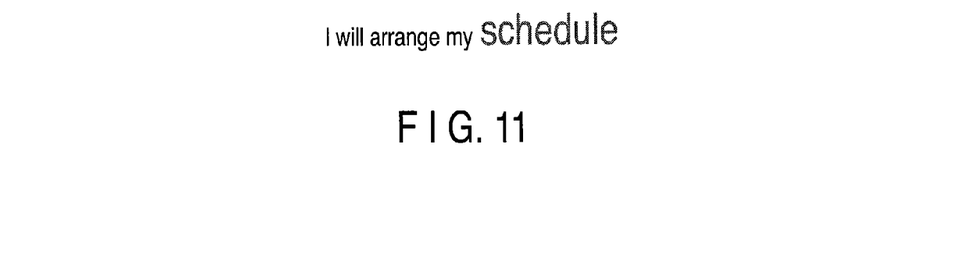
FIG. 11 shows an example of a display character string shown on a display.

FIG. 11 shows an example of a manner in which the character string including the emphasis character string shown in FIG. 10 is displayed on the display 157 as a display character string.

As shown in FIG. 11, the characters "I will arrange my", which are not the emphasis character string, is displayed in a normal way. The characters "schedule", which are the emphasis character string, are displayed in a large bold font and in a different color in accordance with the emphasis method indicated by the emphasis character string, since they constitute a word whose pronunciation recognition frequency is low.

In the first embodiment described above, even a word the user is unfamiliar with is highlighted in accordance with the user's experience and knowledge, based on how frequently the user has heard the pronunciation and how long the period has been since the user heard the pronunciation last time. The highlighting enables the user to understand the correspondence between the word and the pronunciation, and thus helps understand the utterance.

Modification of First Embodiment

In the first embodiment, the transmission device 101 performs speech recognition processing, while the receiving apparatus 151 performs emphasis determination processing for words and display character string generation processing, based on the speech recognition result information, and further performs text display. This modification differs from the first embodiment in that the transmission device 101 performs only the input of speech and the reception device performs only the text display (subtitle display), with the speech recognition processing, the emphasis determination processing, and the display character string generation processing being performed by a server.

Figure 12:
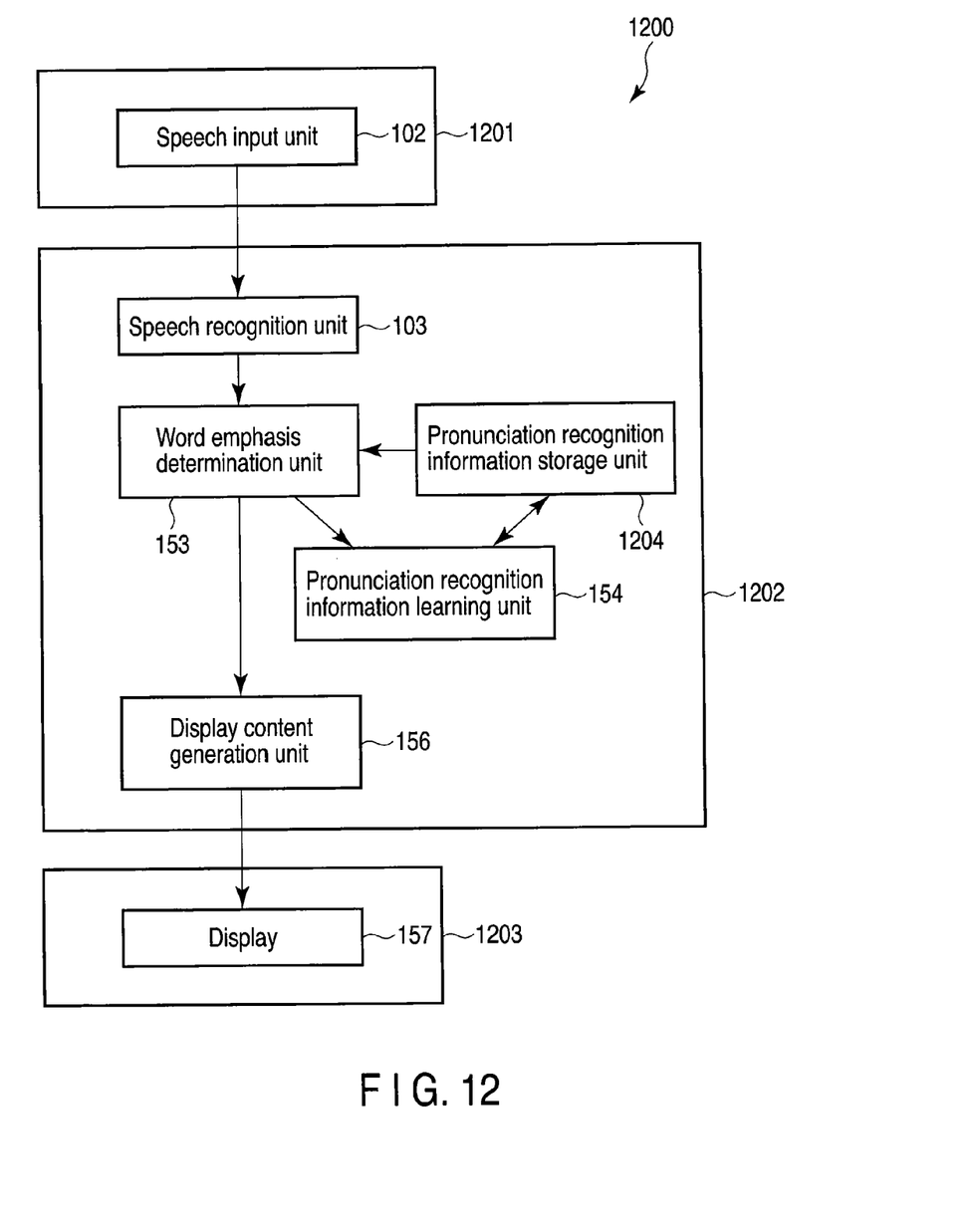
FIG. 12 is a block diagram illustrating a meeting support apparatus according to a modification of the first embodiment.

A meeting support apparatus according to the modification will be described with reference to the block diagram shown in FIG. 12.

The meeting support apparatus 1200 of the modification includes a transmission device 1201 (a speech input unit 102), a server 1202, and a reception device 1203 (a display 157). The server 1202 includes a speech recognition unit 103, a word emphasis determination unit 153, a pronunciation recognition information learning unit 154, a pronunciation recognition information storage unit 1204, and a display content generation unit 156.

The speech input unit 102, the recognition unit 103, the word emphasis determination unit 153, the pronunciation recognition information learning unit 154, and the display content generation unit 156 perform similar operations to those of the first embodiment, and a description of those elements will omitted herein.

The pronunciation recognition information storage unit 1204 stores storage information for each of users. Since the storage information specially prepared for each of the users is used, the highlighting of words can be performed for each user.

In the above-mentioned modification of the first embodiment, storage information is recorded in the server for each of the users. The modification is advantageous in that the transmission device and the reception device can be as simple as possible and yet enjoys similar advantages to those of the first embodiment.

Second Embodiment

The first embodiment inevitably highlights the characters of words having a low pronunciation recognition frequency, based on the pronunciation recognition frequencies stored in the pronunciation recognition information storage unit. The second embodiment differs from the first embodiment in that it does not highlight the characters when the user regards the highlighting of the characters as being unnecessary. Owing to this feature, the second embodiment can perform highlighting in accordance with the usage state by the user and the learning state of the user.

Figure 13:
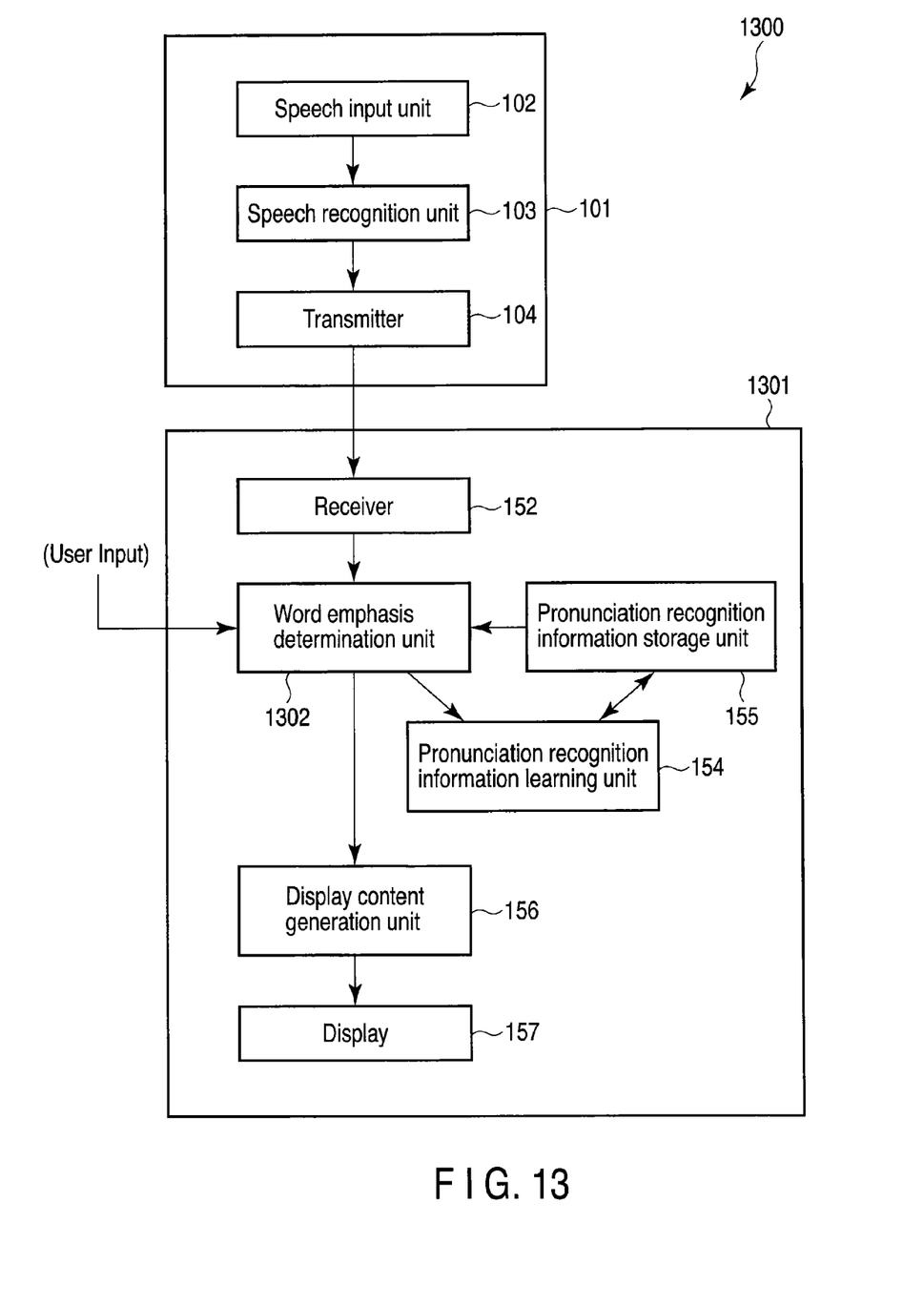
FIG. 13 is a block diagram illustrating a meeting support apparatus according to the second embodiment.

A meeting support apparatus according to the second embodiment will be described with reference to the block diagram shown in FIG. 13.

The meeting support apparatus 1300 of the second embodiment includes a transmission device 101 and a reception device 1301. The reception device 1301 includes a receiver 152, a word emphasis determination unit 1302, a pronunciation recognition information learning unit 154, a pronunciation recognition information storage unit 155, a display content generation unit 156, and a display 157. The receiver 152, the pronunciation recognition information learning unit 154, the pronunciation recognition information storage unit 155, and the display content generation unit 156 perform similar operations to those of the first embodiment, and a description of those elements will be omitted herein.

The word emphasis determination unit 1302 performs a substantially similar operation to that of the word emphasis determination unit 153, except that the frequency emphasis level is changed in response to the receipt of a user input. To be more specific, if a user designates a command that disables the highlighting and that command is input when the frequency emphasis level is "3", then the frequency emphasis level is decreased from "3" to "0." As a result, the corresponding word is not highlighted. Words may be highlighted in accordance with the usage state by the user in response to user inputs, for example, an input that lowers the frequency emphasis level from "3" to "1" or an input that increases the frequency emphasis level from "1" to "2."

User inputs may be supplied to the display content generation unit 156, although not shown. In this case, even when a word has a frequency emphasis level of "1" or more and is highlighted in normal cases, the display content generation unit 156 operates in response to a user input and does not highlight the word, i.e., the word is stored in the buffer without the start tag 901 and end tag 902 shown in FIG. 9 being combined to the word.

The second embodiment is featured in that the frequency emphasis level can be changed in response to a user input, and a word is not highlighted, if so desired. In addition, the degree of highlighting can be adjusted. Therefore, highlighting can be performed in accordance with the usage state by the user and the learning state of the user.

The embodiments were described, referring to the case where English spoken in a meeting is subjected to speech recognition and character strings which are results of this speech recognition are highlighted. This is in no way restrictive, and any language other than English can be processed. In addition, even when a language other than the mother tongue is displayed as a subtitle in a television broadcast or movie, the highlighting method of the present embodiments can be applied.

The flow charts of the embodiments illustrate methods and systems according to the embodiments. It will be understood that each block of the flowchart illustrations, and combinations of blocks in the flowchart illustrations, can be implemented by computer program instructions. These computer program instructions may be loaded onto a computer or other programmable apparatus to produce a machine, such that the instructions which execute on the computer or other programmable apparatus create means for implementing the functions specified in the flowchart block or blocks. These computer program instructions may also be stored in a computer-readable memory that can direct a computer or other programmable apparatus to function in a particular manner, such that the instruction stored in the computer-readable memory produce an article of manufacture including instruction means which implement the function specified in the flowchart block or blocks. The computer program instructions may also be loaded onto a computer or other programmable apparatus to cause a series of operational steps to be performed on the computer or other programmable apparatus to produce a computer programmable apparatus which provides steps for implementing the functions specified in the flowchart block or blocks.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A meeting support apparatus comprising:
a storage unit configured to store storage information for each of words, the storage information indicating a word of the words, pronunciation information on the word, and pronunciation recognition frequency which represents number of times that same pronunciation corresponding to the word is spoken; a determination unit configured to generate emphasis determination information including an emphasis level that represents whether or not a first word of the words is highlighted and represents a degree of highlighting determined in accordance with a pronunciation recognition frequency of a second word of the words when the first word is highlighted, the generating the emphasis determination information being based on whether or not the storage information includes a second set corresponding to a first set and based on the pronunciation recognition frequency of the second word when the second set is included in the storage information, the first set representing a combination between the first word and pronunciation information on the first word, the second set representing a combination between the second word and pronunciation information on the second word and being pre-stored in the storage unit; and
a generation unit configured to generate an emphasis character string based on the emphasis determination information when the first word is highlighted, the emphasis character string being obtained by combining a symbol to the first word, the symbol representing that the degree of highlighting is increased in accordance with an increase in the emphasis level.

2. The apparatus according to claim 1, wherein the storage unit further stores last-pronounced time information representing a time when a word is pronounced last, as the storage information, further comprising a learning unit configured to record the first set in the storage information and record pronunciation time information including a time when the first word of the first set is pronounced, as new last-pronounced time information.

3. The apparatus according to claim 2, further comprising a recognition unit configured to convert a speech signal into a word corresponding to the speech signal and thereby generate the first set and pronunciation time information on the first set;
wherein the storage unit stores storage information for each of users.

4. The apparatus according to claim 1, wherein:
if the second set is not included in the storage information, the determination unit determines the emphasis level to be high;
if the second set is included in the storage information and a ratio of a number of pronunciation recognition frequencies of the second set to a total number of pronunciation recognition frequencies of all pronunciation information corresponding to second words is less than a first threshold, the determination unit determines the emphasis level to be high in accordance with an decrease in the ratio, and
if the second set is included in the storage information and the ratio is not less than the first threshold, the determination unit determines that the first word fails to be highlighted.

5. The apparatus according to claim 4, wherein the determination unit determines the emphasis level to be further high if a difference between the pronunciation time information on the first set and the last-pronounced time information on the second set is not less than a second threshold.

6. The apparatus according to claim 1, further comprising a display configured to display a display character string including the first word emphasized in accordance with the emphasis character string.

7. The apparatus according to claim 1, wherein the determination unit changes the emphasis level in accordance with an instruction signal if the instruction signal is received.

8. A meeting support method comprising:
storing in a storage unit storage information for each of words, the storage information indicating a word of the words, pronunciation information on the word, and pronunciation recognition frequency which represents number of times that same pronunciation corresponding to the word is spoken;
generating, by a processor, emphasis determination information including an emphasis level that represents whether or not a first word of the words is highlighted and represents a degree of highlighting determined in accordance with a pronunciation recognition frequency of a second word of the words when the first word is highlighted, the generating the emphasis determination information being based on whether or not the storage information includes a second set corresponding to a first set and based on the pronunciation recognition frequency of the second word when the second set is included in the storage information, the first set representing a combination between the first word and pronunciation information on the first word, the second set representing a combination between the second word and pronunciation information on the second word and being pre-stored in the storage unit; and
generating, by the processor, an emphasis character string based on the emphasis determination information when the first word is highlighted, the emphasis character string being obtained by combining a symbol to the first word, the symbol representing that the degree of highlighting is increased in accordance with an increase in the emphasis level.

9. A non-transitory computer readable medium including computer executable instructions, wherein the instructions, when executed by a processor, cause the processor to perform a method comprising:
storing in a storage unit storage information for each of words, the storage information indicating a word of the words, pronunciation information on the word, and pronunciation recognition frequency which represents number of times that same pronunciation corresponding to the word is spoken;

generating emphasis determination information including an emphasis level that represents whether or not a first word of the words is highlighted and represents a degree of highlighting determined in accordance with a pronunciation recognition frequency of a second word of the words when the first word is highlighted, the generating the emphasis determination information being based on whether or not the storage information includes a second set corresponding to a first set and based on the pronunciation recognition frequency of the second word when the second set is included in the storage information, the first set representing a combination between the first word and pronunciation information on the first word, the second set representing a combination between the second word and pronunciation information on the second word and being pre-stored in the storage unit; and generating an emphasis character string based on the emphasis determination information when the first word is highlighted, the emphasis character string being obtained by combining a symbol to the first word, the symbol representing that the degree of highlighting is increased in accordance with an increase in the emphasis level.

* * * * *